(12) United States Patent
Melamed et al.

(10) Patent No.: US 8,291,066 B2
(45) Date of Patent: Oct. 16, 2012

(54) METHOD AND SYSTEM FOR TRANSACTION MONITORING IN A COMMUNICATION NETWORK

(75) Inventors: Shawn Melamed, Mevasseret Zion (IL); Amir Knipel, Mikhmoret (IL); Einat Or, Tel Aviv (IL); Eyal Klingbell, Rehovot (IL)

(73) Assignee: Trading Systems Associates (TS-A) (Israel) Limited, London (GB)

( * ) Notice: Subject to any disclaimer, the term of this patent is extended or adjusted under 35 U.S.C. 154(b) by 568 days.

(21) Appl. No.: 11/708,136

(22) Filed: Feb. 20, 2007

(65) Prior Publication Data

US 2007/0206633 A1 Sep. 6, 2007

Related U.S. Application Data

(60) Provisional application No. 60/774,658, filed on Feb. 21, 2006.

(51) Int. Cl.
G06F 15/173 (2006.01)
(52) U.S. Cl. ........................................ 709/224
(58) Field of Classification Search .................. 709/224
See application file for complete search history.

(56) References Cited

U.S. PATENT DOCUMENTS

| | | | | |
|---|---|---|---|---|
| 4,881,178 A * | 11/1989 | Holland et al. | ................ | 706/12 |
| 6,651,101 B1 * | 11/2003 | Gai et al. | ................ | 709/224 |
| 6,826,576 B2 * | 11/2004 | Lulich et al. | ................ | 707/740 |
| 7,003,781 B1 * | 2/2006 | Blackwell et al. | ............ | 719/327 |
| 7,457,870 B1 * | 11/2008 | Lownsbrough et al. | ...... | 709/224 |

(Continued)

FOREIGN PATENT DOCUMENTS

EP 1 603 307 A2 7/2005

OTHER PUBLICATIONS

Gusfield, D. *Algorithms on Strings, Trees and Sequences.* Cambridge University Press, pp. 215-245. 1997.

*Primary Examiner* — Aaron Strange
*Assistant Examiner* — James Edwards
(74) *Attorney, Agent, or Firm* — Vorys, Sater, Seymour and Pease LLP; Susanne M. Hopkins; William L. Klima (57) ABSTRACT

The invention provides a method for learning and identification of message types in a network in which the learning and identification is based solely upon information contained in messages in the network. In one embodiment, the method includes comparing a current message with one or more previously defined message structures and applying a comparison method in order to infer whether the structure of the current message conforms to any one of the previously defined message structures. The invention also provides a method for classifying a collection of messages input or output from a computational node in which the set of messages is portioned into subsets of similar messages, and a structure of the messages of each subset is characterized. The invention further provides a method for inferring causal relations between a message type input to a computational node in a network and message type output from the computational node in the network using one or more statistical tests. The invention further provides a system for monitoring transactions within a distributed information network. The system includes collection servers that execute a classification module and a correlation module. A management server analyzes data from the collection servers in order to determine a performance of the transactions in the system.

22 Claims, 5 Drawing Sheets

U.S. PATENT DOCUMENTS

| | | | |
|---|---|---|---|
| 7,558,832 B2 * | 7/2009 | Rounthwaite et al. | 709/206 |
| 2002/0062368 A1 * | 5/2002 | Holtzman et al. | 709/224 |
| 2004/0122942 A1 * | 6/2004 | Green et al. | 709/224 |
| 2004/0133672 A1 * | 7/2004 | Bhattacharya et al. | 709/224 |
| 2004/0215770 A1 * | 10/2004 | Maher et al. | 709/224 |
| 2004/0236849 A1 * | 11/2004 | Cooper et al. | 709/224 |
| 2004/0243349 A1 * | 12/2004 | Greifeneder et al. | 702/183 |
| 2005/0192894 A1 * | 9/2005 | Klein et al. | 705/39 |
| 2006/0002386 A1 * | 1/2006 | Yik et al. | 370/389 |
| 2006/0015512 A1 * | 1/2006 | Alon et al. | 707/100 |
| 2006/0272006 A1 * | 11/2006 | Wei et al. | 726/2 |
| 2008/0059625 A1 * | 3/2008 | Barnett et al. | 709/223 |
| 2008/0082683 A1 * | 4/2008 | DelloStritto et al. | 709/236 |

* cited by examiner

METHOD AND SYSTEM FOR TRANSACTION MONITORING IN A COMMUNICATION NETWORK

This application claims the benefit of prior U.S. provisional patent application No. 60/774,658 filed Feb. 21, 2006, the contents of which are hereby incorporated by reference in their entirety.

FIELD OF THE INVENTION

This invention relates to methods and systems for transaction monitoring in a communication network.

BACKGROUND OF THE INVENTION

The typical enterprise technology landscape today is characterized by the distributed nature of its information systems and the heterogeneity of its technologies. Following decades of evolution and innovation, it is common to see "best-of-breed" packaged applications, such as ERP, CRM, SCM, SRM, PLM, etc., home-grown systems, and legacy applications, each with numerous interfaces interconnecting them. In these distributed and complex environments, the act of processing a typical transaction spans numerous applications and technological boundaries, often rendering the enterprise incapable of understanding execution paths for the transactions as well as their logical and technical interdependencies. Without the requisite knowledge of how the transactions are executed, the enterprise is severely limited in its ability to monitor transactions and to detect and remedy bottlenecks, latencies, and points-of-failure.

Enterprise organizations therefore seek to increase the visibility of their automated business transactions as they see a direct correlation between transaction visibility and business performance. Achieving a high-degree of visibility enables the enterprise to improve customer service, to monitor transaction performance and health, to optimize the business logic, and to implement efficient solutions to problems as they arise.

US Patent Publication 2005/0192894 to Klein et al, discloses a method for reconstructing instances of transactions using predefined transaction information by correlating the text between pairs of the messages in the instance of the transaction.

U.S. Pat. No. 7,003,781 to Blackwell et al discloses a method and system for monitoring a distributed data processing system. Generated Application Program Interface (API) calls are examined to determine if a particular API call meets predetermined API call criteria. If a particular API call meets the predetermined API call criteria, a portion of the content of the API call is stored as a stored event. Stored events are processed to identify logically correlated events, such as those associated with a particular business transaction. Stored API call content data is displayed for the logically correlated events.

US Patent Publication 20060015512 to Alon et al discloses an apparatus for monitoring a selected tier in a multi-tier computing environment. The apparatus includes a context agent and a dynamic tier extension. The context agent is associated with a selected tier, and is coupled with other context agents, each of which is associated with a respective tier. The dynamic tier extension is coupled with the context agent and with specific predetermined points of the selected tier, such as at least a request entry port of the selected tier. The dynamic tier extension monitors request traffic passing through the selected tier, the monitored request traffic including at least one entering request received at a request entry port from an adjacent tier. The dynamic tier extension identifies each request in the monitored request traffic and sends at least the request identifier to the context agent. The context agent also receives information relating to the request context of the entering request from the context agent associated with the adjacent tier. The context agent associates the information relating to the request context of the entering request with the entering request, in accordance with the received request identifier.

SUMMARY OF THE INVENTION

Glossary

There follows a glossary of terms used in the following description and set of claims together with their definitions, some of them known in the art, others having been coined.

Computational Node

A computational node is a node of a communication network that receives and/or generates information. For the sake of convenience, a computational node is sometimes referred to herein simply a "node". Examples of nodes are a web server, database server, a queue, a virtual server in a virtual environment, and a process within a server. A cluster, a redundancy system, and multiple instances of the same server are considered as being a single node.

A Message

A message is the unit of information sent on the application layer. Three types of information related to a message are defined: network information (TCP/IP), instance information and application (Application layer) information.

Example: A message from a PC to a web server, containing a request for a web page. This is an HTTP message of the method "get". Consider an "Update" message to a database of a bank. Assume it has the following structure:

Type: Update. SessionId: XXX. Action: Deposit/Withdrew. AccountNum: XXX. Amount: XXX.

Message Type

Two or more messages that are sent from a particular origin node in the network to a particular destination node are considered to be of the same type if they have the same structure and cause the same action in the application.

Direct Causal Relation between an Input Message Type and an Output Message Type

Two messages of type A and B are causally related if arrival of a message of type A at its destination node causes a message of type B to be generated from that node.

Example: Consider a "Buy" order that could only be executed if approved by 4 sources. Then the direct causal relation of the "buy" message exists with all 4 approval messages.

In one of its aspects, the present invention provides a classification module that attempts to infer the type of a message based upon the message's structure by comparing the message with previously encountered message structures. A message is input to a fast detection module that compares the structure of the present message with message structures defined by a classifier based upon the message structures of previously encountered messages. The fast detection module applies one or more statistical tests in order to infer whether the structure of the present message conforms to any one of the previously encountered message structures. When the fast detection module succeeds in identifying a previously encountered message structure to which the present message structure conforms, the message, together with its network data and inferred structure are stored in a collector. When the fast detection module fails to identify a message structure in the memory to which the present message structure conforms, the message is input to a classifier that collects messages arriving to and departing from each computational node whose structure was not identified by the fast detection module. The classifier runs a classification algorithm which partitions the set of messages input or output to or from a computational node into subsets of messages such that messages in each subset have the same inferred structure and are thus presumed to be of a specific message type. The algorithm returns, for each message type defined by the partition, an inferred message structure that represents the message type.

The memory of the fast detection module thus holds a list of inferred structures of message types that is updated by the classifier whenever the classifier encounters a new message structure. Furthermore, the classifier learns message types solely based upon information contained in the messages input to the classification module and does not rely on any predefined knowledge of the message types or any other user provided definitions.

In another of its aspects, the invention provides a correlator module that infers causal relations between input and output message types at a computational node. The correlator module maintains, for each computational node, a first collection of sets of messages input to the computational node during a specific time period, and a second collection of sets of messages output from the computational node during the same time period, where the messages in each set is of the same inferred message type. One or more statistical test are applied to detect causal relations between message types input to the computational node and message types output from the computational node. For each test executed, an output is generated indicative of an extent to which the input and output sets of messages are causally related. When two or more tests are executed, the outputs of the tests are input to a message type correlator that outputs, for each pair of an input message type and an output message type a final inference as to whether the input and output message types are causally related.

For each pair of an input message type and an output message type inferred to have a causal relation between them, the message type correlator outputs statistics of the pair such as the service time of the pair at the computational node.

In still another of its aspects, the invention provides a system for monitoring transactions within a distributed information network. The monitoring system of the invention is based on following data flow in the transport layer of the network, is non-intrusive, and does not need predefined information on the transactions or the messages. In accordance with this aspect of the invention, the system comprises one or more collection servers and a management server. Each collection server executes the classification module and the correlation module of the invention. The management server gathers information relating to the message flow in the network from the analysis and result storage of each collection server in the network. The data gathered at the management server is used to reconstruct transactions in the network and to derive a baseline behavior of the transactions in the network from the statistics provided by each collection server on routing and service time performance. The present value of the statistics may be compared to the baseline behavior and an alert may be issued when the current behavior of the network deviates significantly from the baseline behavior. The system may include a monitor for displaying such alerts and any other relevant information on the network.

Thus, in its first aspect, the present invention provides a method for learning and identification of message types in a network comprising learning and identification of message types based solely upon information contained in two or more messages.

In its second aspect, the invention provides a method for classifying a collection of messages input or output from a computational node comprising partitioning the set of messages into subsets of similar messages, and characterizing a structure of the messages of each subset.

In its third aspect, the invention provides a method for inferring causal relations between a message type input to a computational node in a network and message type output from the computational node comprising applying one or more statistical tests.

In its fourth aspect, the invention also provides a system for monitoring transactions within a distributed information network comprising:
 (a) a management server;
 (b) one or more message collection servers; each collection server being configured to execute one or both of a classification module and a correlation module, and each message collection server sending outputs from one or both of the classification module and the correlation module to the management server;
wherein the management server is configured to analyze data from the one or more collection servers in order to determine a performance of the transactions in the system.

The invention also provides a computer program comprising computer program code means for performing all the steps of the methods of the invention when said program is run on a computer, and such a computer program embodied on a computer readable medium.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF EXEMPLARY EMBODIMENTS

Figure 1:
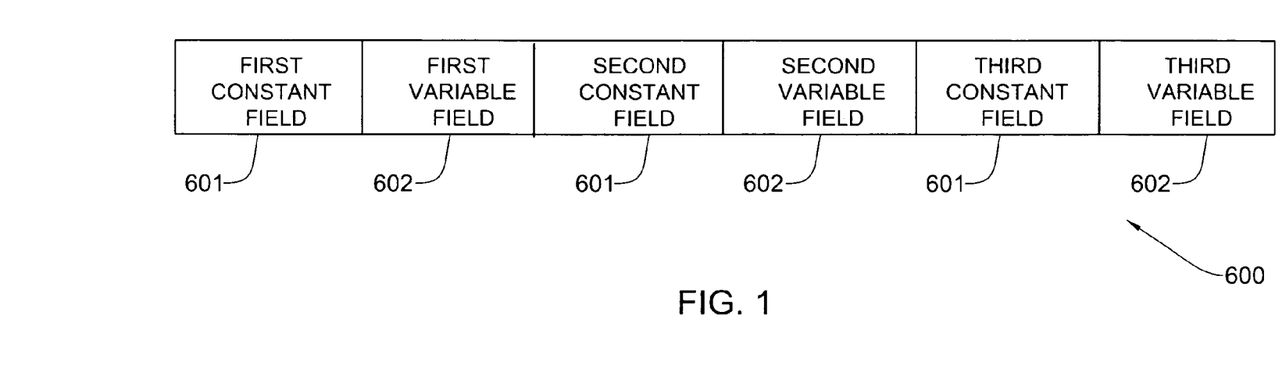
FIG. 1 shows a typical message structure.

Each message sent between computational nodes in a network is composed using structural rules that are specific to its type. Therefore messages of the same type have a common structure. An example of a message structure 600 is shown in FIG. 1. The structure 600 consists of a number of constant fields 601, where each constant field 601 is followed by a variable field 602. All of the messages of a given message type have the same constant fields 601, but different messages of the same type may have different values of any of the variable fields. Three constant fields 602 are shown in FIG. 1. This is by way of example only, and a message structure may have any number of constant fields.

Figure 2:
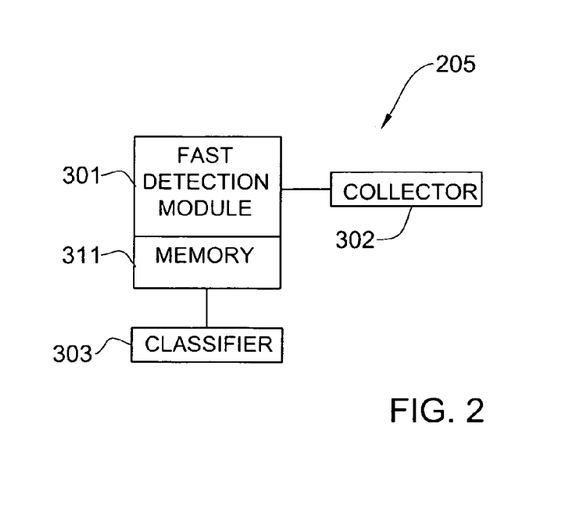
FIG. 2 shows a classification module in accordance with one embodiment of the invention.

FIG. 2 shows a classification module, generally indicated by 205, in accordance with one embodiment of this aspect of the invention. The classification module 205 attempts to infer the type of a given message using a learning and identification algorithm described below, in which the message is compared with message structures previously encountered by the classification module 205. The classification module 205 comprises a fast detection module 301 having a memory 311 that communicates with a classifier 303 and a collector 302.

Figure 3:
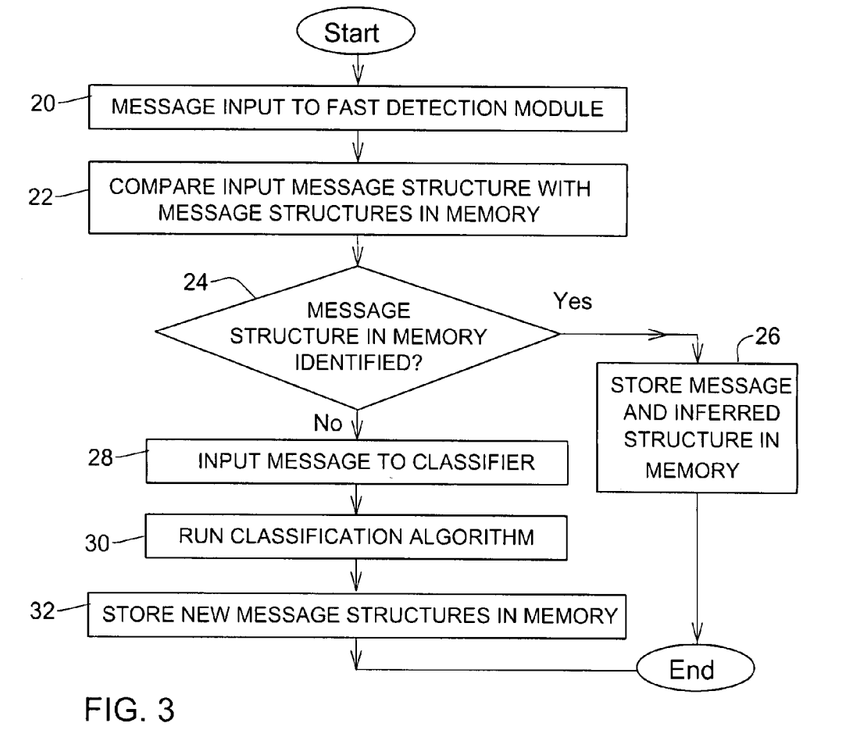
FIG. 3 shows a method for learning and identification of message types carried out by the classification module of FIG. 2 in accordance with one embodiment of the invention.

FIG. 3 shows a method for learning and identification of message types carried out by the classification module 205 in accordance with one embodiment of this aspect of the invention. In step 20 a message is input to the fast detection module 301. In step 22, the fast detection module 301 compares the present message with message structures defined by the classifier 303 based upon previously encountered messages and stored in the memory 311. The comparison may be done by alignment of the message to the structure so as to maximize the similarity of the message to the constant fields of the structure, using alignment methods presented, for example, in Dan Gusfield, "Algorithms on Strings, Trees and Sequences", Cambridge University Press., pp 215-245, 1997. In step 24, it is determined whether the fast detection module 301 succeeded in identifying a message structure in the memory 311 to which the structure of the present message conforms. If the fast detection module 301 succeeded in identifying a message structure in the memory to which the present message conforms, the identified message structure is referred to herein as the input message's "inferred structure", and in step 26 the message, together with its network data and inferred structure are stored in the collector 302, and the process ends.

If at step 24 it was determined that the fast detection module 301 failed to identify a message structure in the memory to which the present message structure conforms, then in step 28 the message is input to the classifier 303. The classifier 303 collects messages arriving to and departing from each computational node whose structure was not identified by the fast detection module 301. The classifier 303, in step 30, runs a classification algorithm, which partitions the set of messages input or output to or from a computational node into subsets of similar messages. In one preferred embodiment, the classification algorithm uses a hierarchical classification algorithm utilizing a message alignment score as a diversity function. The alignment scoring may be performed, for example, as disclosed in Dan Gusfield, "Algorithms on Strings, Trees and Sequences", Cambridge University Press, pp 215-245, 1997. For each subset, a common structure is then inferred for all of the messages in the subset. For this, all of the messages of the subset are aligned together. Fields that are substantially similar in all of the messages of the subset are designated as constant fields. The other fields are designated as variable fields. The classification algorithm returns, for each message type defined by the partition, the inferred structure of the message type. In step 32, these new message structures are input to the memory 311 of the fast detection module 301, and the process ends.

Figure 4:
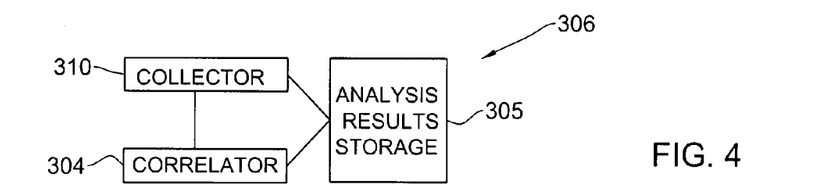
FIG. 4 shows a correlator module, in accordance with one embodiment of the invention.

The memory 311 of the fast detection module 301 thus holds a list message structures that is updated by the classifier 303 whenever the classifier 303 encounters a new message structure. Furthermore, the classifier 303 learns message types solely based upon information contained in the messages input to the classification module 303 and does not rely on any predefined knowledge of the message types or any other user provided definitions FIG. 4 shows a correlator module, generally indicated by 306 in accordance with one embodiment of this aspect of the invention. The correlator module 306 includes a collector 310 that may be the collector 302 described above in reference to FIG. 2. The correlator module 306 further includes a correlator 304 and an analysis and results storage 305.

The collector 310 maintains, for each computational node, a first collection of sets of messages input to the computational node during a specific time period, and a second collection of sets of messages output from the computational node during the same time period, where all of the messages in each set have the same inferred structure and are thus of the same message type. The first and second collections are input to the correlator 304.

Figure 5:
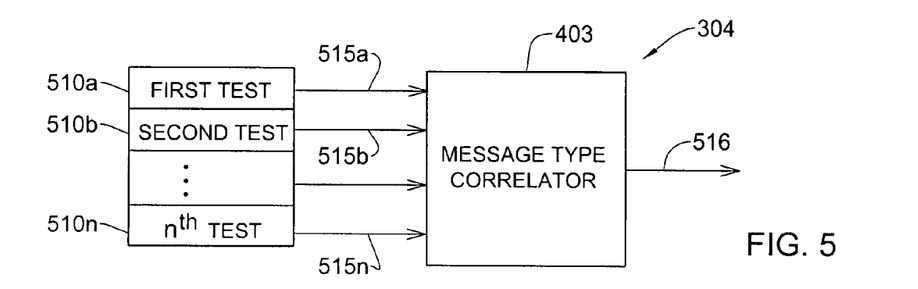
FIG. 5 shows the structure of a correlator of the correlator module of FIG. 4.

The structure of the correlator 304 is shown in FIG. 5. The correlator 304 comprises one or more test modules 510. Each test module applies a statistical test to detect causal relations between message types input to the computational node and message types output from the computational node. The statistical test is executed on each pair consisting of the set of messages of an input message type and the set of messages of an output message type. For each test executed by a test module 510, the module outputs a respective output 515 indicative of an extent to which the input and output sets of messages are causally related. In one embodiment, one or more of the outputs 515 are binarized outputs where a "1" indicates that the test module has determined that the input message type and the output message type are causally related and "0" indicates that the test module has determined that the input message type and the output message type are not causally related. In another embodiment, one or more of the outputs 515 are in the form of a probability of rejecting the null hypothesis (the two sets are causally related) assuming the null hypothesis is correct.

As one example of a test executed by a test module 510, the test module 510 may receive from the collector 310 a time line of each set of messages. The time line consists of a list of occurrences, where each occurrence is the arrival or departure time of the messages in the set. Then for each pair of an input set of massages and an output set of messages, the test module 510 executes an algorithm that calculates a convolution of the input and output time lines, finds the delay $\tau$ for which the convolution is maximal, and the value of the convolution at the delay $\tau$. In one embodiment, if the maximal value of the convolution is above a predetermined threshold, the time test module 510 outputs an output of 1 indicating that the input message type and the output message type are causally related. In this case, the test module 510 also outputs the value of the delay $\tau$ as the service time of the pair consisting of the input message type and the output message type. Otherwise, the test module 510 outputs an output of 0 indicating that the input message type and the output message type are not causally related. In another embodiment; the test module 510 calculates a probability that the maximal value of the convolution is at least the value calculated by the test module under a random prior.

As a second example of a test executed by a test module 510, a test module 510 may execute a data correlation algorithm that establishes whether an input message type and an output message type have a direct causal relation based upon the values of the variable fields 602 of the inferred structure of the input message type and the inferred structure of the output message type. By examining the similarity of the data within one or more variable fields 602 of the input message set, on the one hand, to the values of the one or more variable fields of the output message set, the algorithm determines a probability that the output set was generated based on the input set.

The probability calculations based on given values of the variable fields may be done, for example using a string matching method, for example, as disclosed in "Algorithms on strings, trees and sequences", Dan Gusfield, Cambridge university press, 1997, pages 215-245. In one embodiment, if the probability is above a given threshold, then the message types are considered causally related by data considerations. In another embodiment; the test module 510 calculates a probability that the output set was generated based on the input set is at least the value calculated by the test module under a random prior.

By way of an example, the set of input messages might be the following list of messages:

---
IDJohnSmith1234CommandBUYSymbolCGENAmout1500
IDMarkSmith1235CommandBUYSymbolCGENAmout1500
IDJohnCohen1236CommandBUYSymbolCGENAmout1600
--- and the set of output messages might be the following list of messages:

---
CommandCheckbalanceFirstNameJohnLastNameSmithAccountNum1234
CommandCheckbalanceFirstNameMarkLastNameSmithAccountNum1235
CommandCheckbalanceFirstNameJohnLastNameCohenAccountNum1236
---

In this example, the data correlation algorithm would be expected to conclude that the input message type is causally related by data to the output message type based on the similarity between the variable fields following Command-CheckbalanceFirstName, LastNam and AccountNum in the output message set and the input variable field following ID and that the variable fields were not created at random.

When the correlator 304 executes two or more tests, the outputs 515 of the tests are input to a message type correlator 403. The message type correlator 403 outputs, for each pair of an input message type and an output message type a final determination as to whether the input and output message types are causally related. The output 516 of the correlator 403 is determined based upon the outputs 515 of the test modules 510. In one embodiment, the output 516 is binarized, where 1 indicates that the correlator has determined that the input message type and the output message type are causally related and 0 indicates that the test module has determined that the input message type and the output message type are not causally related. In another embodiment, the output 516 is in the form of a probability of rejecting the null hypothesis (the two sets are causally related) when the null hypothesis is correct and/or a probability of accepting the null hypothesis when it is incorrect.

The output 516 of the correlator 403 may determine, for example, that the message types are causally related only if all of the tests determined that the input and output message types are causally related. As another example, the correlator 403 may determine that the message types are causally related only if at least one of the tests determined that the message types are causally related. As yet another example, the correlator may determine that the message types are correlated only if at least a predetermined number of the tests determined that the message types are causally related. The output 516 of the message type correlator 403 is input to the analysis and results storage 305.

The collector 310 outputs to the analysis and results storage 305 an output consisting of the following:

(a) For each computational node, a list of input message types and a list of output message types that are currently being processed.
(b) The routing time of each message.

When a test module 510 determines that an input message type and an output message type are causally related, the test module also outputs to the message type correlator 403 one or more statistics of the behavior of the pair at the computational node in a recent time frame based upon the test that it executed. For example, when the test calculated a convolution of the time lines, the statistic could be the delay $\tau$ which represents an average service time of input and output message pairs of the particular type during the time frame of the time lines.

For each pair of an input message type and an output message type determined to have a causal relation between them by the message type correlator 403, the message type correlator outputs the statistics of the pair that it received from any of the test modules 510, such as the service time $\tau$, to the analysis results storage 305. The analysis result storage 305 thus contains the set of all pairs consisting of an input message type and an output message type inferred to have a causal relation between them and behavior statistics of the pair at the computational node during a time frame.

Figure 6:
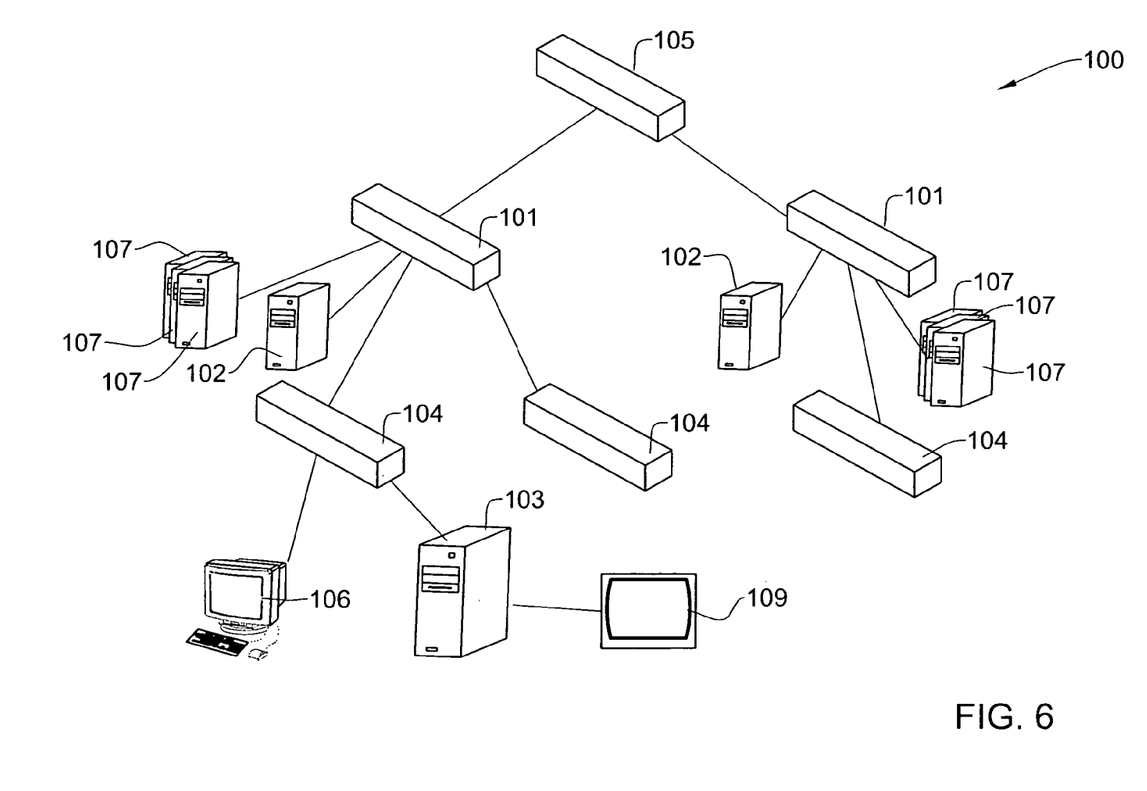
FIG. 6 shows a system, for monitoring transactions within a distributed information network in accordance with one embodiment of this aspect of the invention.

FIG. 6 shows a system, generally indicated by 100, for monitoring transactions within a distributed information network in accordance with one embodiment of this aspect of the invention. The network 100 comprises one or more clients 106, one or more distribution switches 104, and one or more access switches 101. The clients 106, distribution switches 104 and the access switches are arranged in a hierarchy in which one or more clients 106 are connected to a common distribution switch 104 and one or more distribution switches are connected to common access switch 101. The access switches 101 are connected to a core 105 of the network 100. In accordance with this aspect of the invention, the network 100 further comprises one or more collection servers 102 and a management server 103. In the embodiment of FIG. 6, each collection server 102 is connected to a different access switch 101 through a port monitor. The management server 103 is connected to the network 100 at a distribution switch 101. Also included in the system 100 are one or more computational nodes 107 connected to an access switch 101. Each collection server 102 executes the classification module 205, the correlation module 306 and a message reconstructor 310, described below, and sends data stored in the analysis and result storage 305 to the management server 103.

Figure 7:
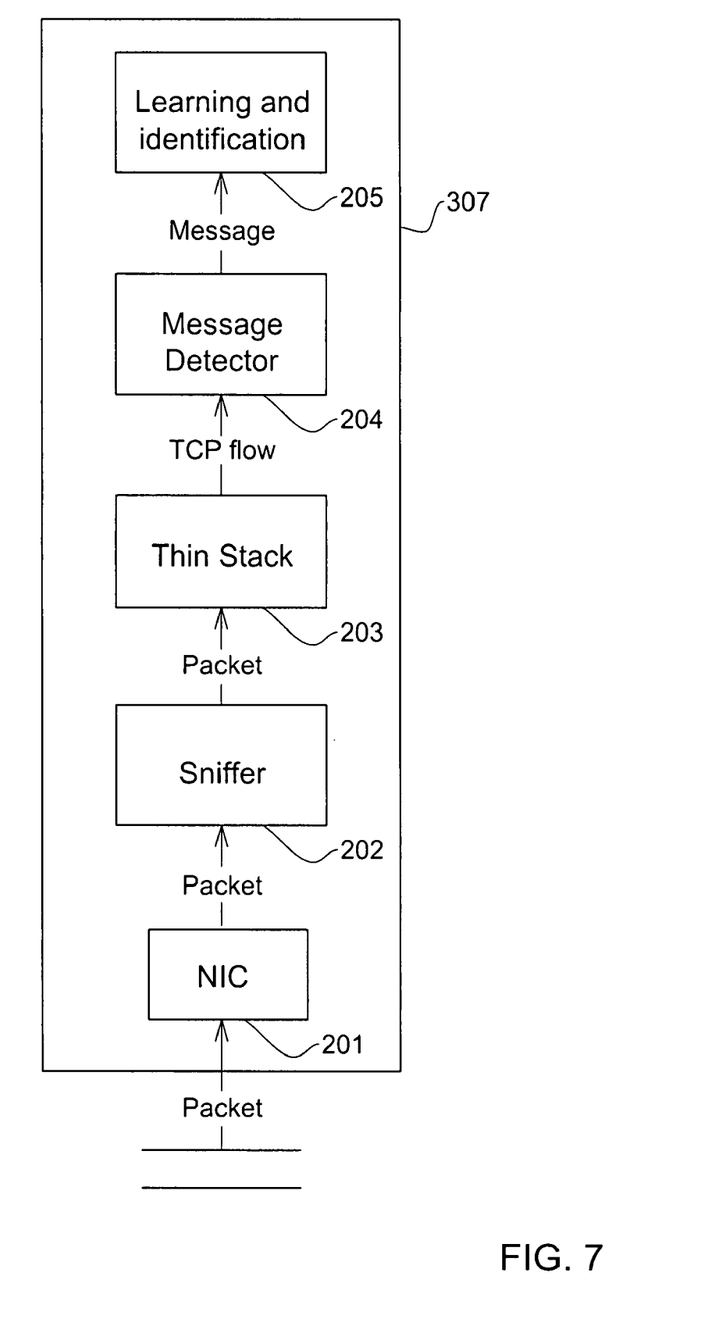
FIG. 7 a message reconstructor for use in the system of FIG. 6.

The message reconstructor 310 is shown in FIG. 7. The message reconstructor 310 comprises a Network Infrastructure Card (NIC) 201 that collects the traffic at the transport layer. A sniffer module 202 empties the Network Infrastructure Card 201 and passes the TCP packets to a thin stack module 203, which reconstructs the TCP flow. Open source utilities such as LibPCAP, Ethereal, and RawSocket may be used for the sniffer 202. A message detector 204 receives the TCP flow and reconstructs the messages of the application layer. The Message Detector 204 receives a TCP flow and divides it into sets of packets that constitute an application layer message using network information within the packets. Each set of packets is then sequenced into a string of bytes which constitute a message, and is outputted to the classification module 205.

The management server 103 gathers information relating to the message flow from the analysis and result storage 305 of each collection server 102 in the network. The data gathered at the management server 103 is used to reconstruct transactions in the network and to derive a baseline behavior of the transactions in the network from the statistics provided by each collocation server 102 on the performance of each pair of an input message type and an output message type having a causal relation between them. The present value of the statistics may be displayed on a monitor 109 that may be connected to the management server 103, or may be accessible over the Internet. The present value of the statistics are continuously compared to the baseline statistics, and when the current value of one or more of the statistics deviates from its baseline value, an alert may be displayed on the monitor 109.

Figure 8:
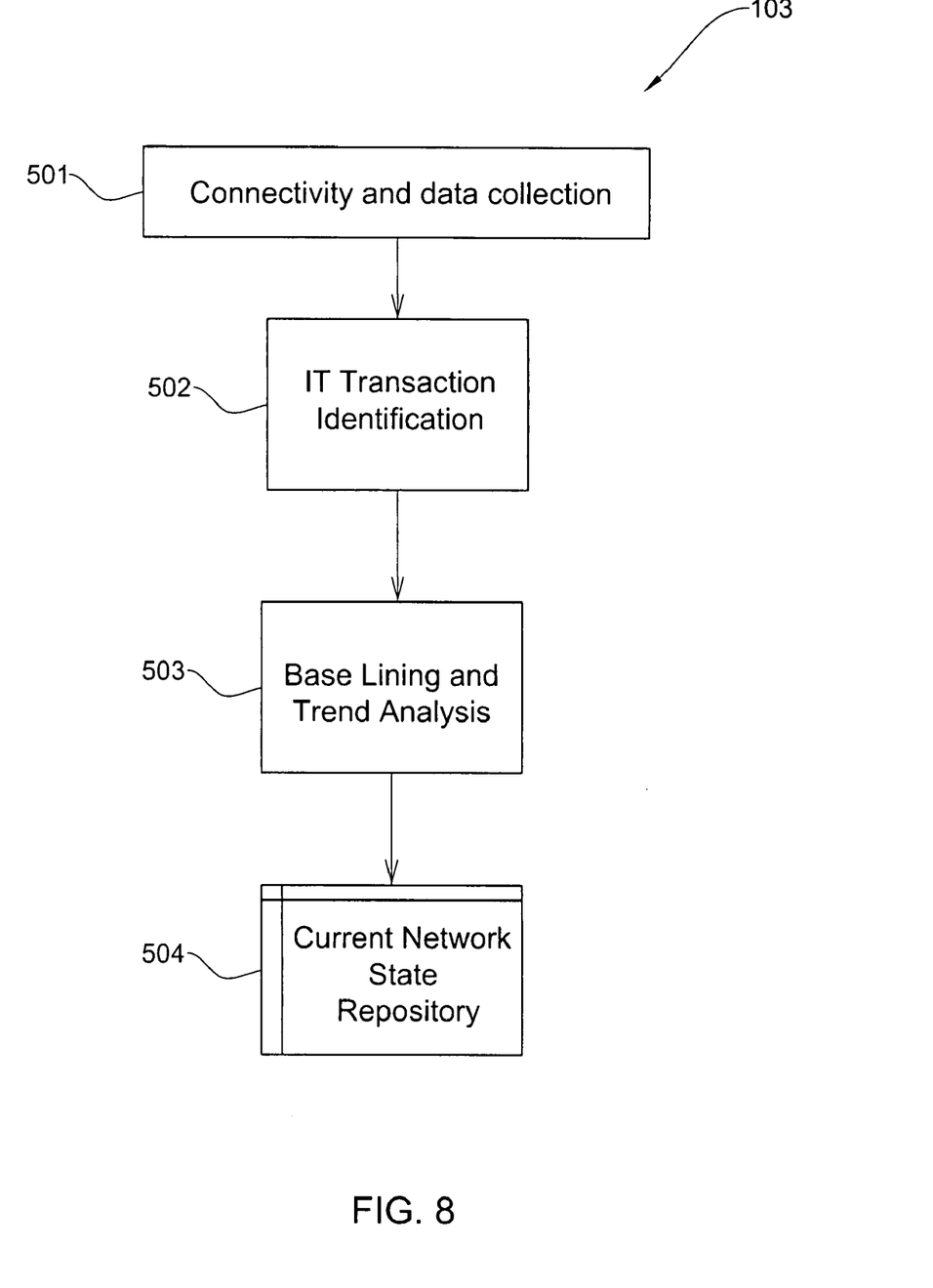
FIG. 8 shows a management server in accordance with one embodiment of the invention.

As shown in FIG. 8 the management server 103 has a connectivity and data collection module 501 that receives the data from the message and data storages 305 of the collection servers 102. Message types and causal relation data are directed to a transaction identification module 502, where the flow of each transaction is reconstructed. The transaction identification module 502 contains the structure of the network 100 and reconstructs all possible transaction types using the causal relations within the input data. For example, a message type that has no causing message types may be considered as an initialization to a transaction. From that initialization message type the module creates the flow of the transaction by recursively looking at the message types caused by the last steps of the transaction. The output is a list of transaction types and their physical flow in the network The output of the transaction identification module 502 is directed to a base lining and trend analysis module 503 together with the data regarding message type performance from the connectivity and data collection module 501 For each message type, pairs of causally related message types and transactions, a base line of performance behavior is defined, and trend rules are formulated. The statistics include, for each message type and causally related pairs, the performance of the network 100 in terms of time, but also information regarding the state of the network at that time. The base lining and trend analysis module 503 analyzes this information and dynamically defines the base line behaviors. An adaptive trend analysis allows the prediction of low performance for a specific message type and or a specific transaction type. This information is sent to the current network state repository 504.

The current network state repository 504 contains the baseline network analysis data and the current network statistics. The current network state repository 504 compares the current statistics with the baselines and applies a statistical test to determine whether any one or more of the current statistics deviates significantly from the baseline. The current network state repository 504 manages the information flow to the monitor 109. The monitor 109 allows an operator to monitor the system via the physical network and via the transaction flow, in order to monitor transaction performance and detect bottlenecks in the transaction flow. It also correlates between physical malfunctions and the transactions affected by the malfunction.

The present invention provides a method to aggregate similar input messages and similar output messages for a computational node to logical groups that constitute a behavioral model for the computational node. This method does not any assumption regarding the nature of the computational node or its output and input streams, excluding the ability to receive the input messages and the output messages one by one.

The method works exactly the same for the whole input messages and the whole output messages as two different groups.

Message Profile

We define a "message profile" as a sequence of bytes which is comprised from "constant sequences" and "variable sequences". A "message profile" is being constituted from several messages (more than 1) on an incremental fashion. We use the message alignment method to build a Message profile for similar message (e.g. byte sequences)

Message Alignment

An "message alignment" between two or more messages means writing the sequences one on top of the other and while adding (sometimes) unique symbols like '-' within these sequences in the alignment.

Diagram 1:
Message alignment between two messages:
Message 1—ABCD
Message 2—ABGD

| A | B | C | D |
|---|---|---|---|
| A | B | G | D |

Diagram 2:
Message alignment between two messages:
Message 1—ABD
Message 2—ABGD

| A | B | — | D |
|---|---|---|---|
| A | B | G | D |

Diagram 3:
Message alignment between three messages:
Message 1—ABD
Message 2—ABGD
Message 3—ABCD

| A | B | — | D |
|---|---|---|---|
| A | B | G | D |
| A | B | C | D |

Both diagrams 1 and 2 illustrate two message alignments that fit the definition. In diagram 2 we have added the symbol '-' as part of the alignment on the third column for the first message. In these diagrams the symbols of A, B, C, D, G stands for any byte value between 0-255.

Similarity Score

We calculate a unique score for each message alignment. This score is determined by summing individual scores for each column. That is, when two or more Symbols (In practice, 2 or more bytes or bits) or more on the same column the score is determined by a score function. The function determines for a set of symbols the relative correctness of this column alignment. When a column is filled with the same symbol for all the sequences we name it as a "match" (for example in diagram 3 we have matches for columns 1, 2 and 4). While when one or more symbols are different from the others on the same column we call it a "mismatch" (For example in diagram 3 we have "mismatch" for column 3).

Constant Sequence

A "constant sequence" within a "message profile" is defined a sequence (one or more) of bytes which are shared between all the messages when these messages are aligned on top of the other. While a "variable sequence" is a sequence (one or more) of place holders that means that on the alignment of these sequences the column of this place holder contains different values or symbols (like '-').

Diagram 4:

"Message Profile" derived from the alignment of three messages

Message 1—ABD
Message 2—ABGD
Message 3—ABCD

| Message 1 | A | B | — | D |
| Message 2 | A | B | G | D |
| Message 3 | A | B | C | D |
| Message Profile | A | B | * | D |

In diagram 4 we see an example for a "Message Profile" with two "constant sequences" and one "variable sequence". The two "constant sequences" are AB and D. The "variable sequence" is denoted here as * for the place holder.

Method to Group Messages into Similar Profiles
1. For every message we check if it fits an already existing Message Profile
   i. Every message profile has a threshold number that describes the minimal similarity score required for a message to be part of that profile.
      1. A similarity score is a function that describes the level of similarity of the alignment.
         a. For example a simple, it can be a simple sum that when a symbol is the same on the same column it would add 100 to the total score and when two symbols are different it will be 1. The similarity will be the sum divided by (the length of the profile*100)
         b. A more elaborated score can be determined by a specific score matrix 255×255. In each cell there is the score that will be determined when byte with value of the row index is on the same column with a byte with value of the column index.
   ii. In order to find the optimal alignment between two a Message Profile and a new message. We use dynamic programming to check the alignment score between the new message and an existing message profile. (See next section called Sequence Alignment Score Calculation)
      1. We calculate the score for Cell (i,j) as the maximum of the following three:
         a. Cell (i−1,j−1)+ScoreMatrix (sequence1 [i], sequence [j])
         b. Cell (i−1, j)+GapFunction(i,j)
         c. Cell (i, j−1)+GapFunction(i,j)
      2. For each cell, we keep a pointer to one of the following best on the corresponding result from 1.
         a. Cell (i−1,j−1)
         b. Cell (i,j−1)
         c. Cell (j−1, i)
      3. We fill the Cells one column at a time
      4. We look at the last cell and then we can back-trace through the best alignment between the message and the message profile.

By our ability to gather Input messages and output messages into message profiles we create a transparent view on the computational node communication patterns. We can use this grouping to calculate the typical computation time that occurs between two profiles (either between two input profiles, two output profiles, or between an input profile and an output profile).

After message profiles were identified, for each message profile we know the location where "interesting" data is past to the Computational Node we can use this data for auditing and journaling of applications. We can also use the extracted data to correlate interrelated inbound message profiles with outbound message profiles.

The present invention provides an ability to look on a server in the network through our analysis mechanism and we enable a far more advanced statistics rather than typical packet base communication analysis. Our improvement is to do statistics and measurements on the "logical" messages and their behavior towards other messages rather than the packets. For example, since a typical behavior occurs for a certain profile we can measure the typical execution time for a specific type of request rather than generic packet roundtrip computation.

The invention claimed is:

1. A system for monitoring transactions within a distributed information network comprising:
   a management server;
   one or more message collection servers, each collection server being configured to execute one or both of a classification module and a correlation module, and each message collection server sending outputs from one or both of the classification module and the correlation module to the management server,
   wherein the management server is configured to analyze data from the one or more collection servers in order to determine a performance of the transactions in the network, and
   one or more collection servers are configured to execute a classification module configured to learn and identify message types based solely upon a structure of each of two or more messages; and
   wherein the learning and identifying messages comprises:
   comparing a structure of a current message with one or more inferred message structures previously stored in a first memory;
   applying one or more statistical tests in order to infer whether the structure of the current message conforms to any one of the previously inferred message structures, and
   if a previous defined message structure to which the current message structure conforms was inferred, storing the message, together with its network data and inferred structure in the first memory;
   if a previously defined message structure to which the current message structure conforms was not inferred, storing the current message in a second memory;
   applying one or more statistical tests to the messages in the second memory to infer one or more message structures among the messages in the second memory; and
   transferring messages in the second memory whose message structure has been inferred to the first memory together with its network data and inferred structure.

2. The system according to claim 1 wherein the management server is further configured to analyze data from the one or more collection servers in order to reconstruct transactions in the network.

3. The system according to claim 1 further comprising partitioning the two or more messages to or from a computational node wherein a hierarchical classification algorithm utilizes a message alignment score as a diversity function.

4. The system according to claim 1 wherein the correlation module infers causal relations between a message type input to a computational node and message type output from the computational node in an algorithm applying one or more statistical tests.

5. The system according to claim 4 wherein one or more outputs of the one or more statistical tests are binarized outputs.

6. The system according to claim 4 wherein one or more outputs of the one or more statistical tests is one or both of a probability of rejecting a null hypothesis that the two sets are causally related assuming the null hypothesis is correct.

7. The system according to claim 4 wherein a statistical test comprises calculating a convolution of a timeline of the input message type and a time line of the message type.

8. The system according to claim 7 wherein the correlation module is further configured to calculate one or both of a delay $\tau$ for which the convolution is maximal and the value of the convolution at the delay $\tau$.

9. The system according to claim 4 wherein the input message type has an inferred structure and the output data type has an inferred structure, and a statistical test comprises a data correlation algorithm inferring whether an input message type and an output message type have a direct causal relationship based upon the values of variable fields of the inferred structure of the input message type and the inferred structure of the output message type.

10. The system according to claim 9 wherein the data correlation algorithm comprises a string matching method.

11. The system according to claim 4 wherein the correlation module applies two or more statistical tests.

12. The system according to claim 11 wherein the correlation module determines a final inference based upon outputs from the two or more statistical tests.

13. The system according to claim 12 wherein the final inference is that the input and output message types are causally related if at least a predetermined number of the tests determined that the message types are causally related and otherwise the final inference is that the input and output message types are not causally related.

14. The system according to claim 4 wherein the correlation module is further configured, for each of one or more of the statistical tests, to calculate one or more statistics of the behavior of the pair of the input and output message types in a recent time frame based upon the statistical test when the statistical inferred that the input message type and an output message type are causally related.

15. The system according to claim 14 wherein a calculated statistic is an average service time of an input message of the input message type and output messages of the output message type.

16. The system according to claim 1 wherein the management server is further configured to reconstruct transactions in the network.

17. The system according to claim 1 wherein the management server is further configured to derive a baseline behavior of the network from statistics provided by one or more of the collocation servers on the performance of each pair of an input message type and an output message type having a causal relationship between them.

18. The system according to claim 17 wherein the management server is further configured to compare a current value of one or more statistics with one or more baseline values of the one or more statistics.

19. The system according to claim 18 wherein the management server is configured to issue an alert when the current value of one or more of the statistics deviates significantly from its baseline value.

20. The system according to claim 1 further comprising a monitor.

21. The system according to claim 20 wherein the management server is configured to display an alert on the monitor.

22. The system according to claim 1 wherein the management server further comprises a message reconstructor comprising:
   a Network Infrastructure Card (NIC) collecting message traffic at the transport layer;
   a sniffer module emptying the Network Infrastructure Card and passing the TCP packets to a thin stack module;
   the thin stack module reconstructing the TCP flow;
   a message detector receiving the TCP flow and reconstructing messages of the application layer; and
   a message detector receiving a TCP flow and dividing the TCP flow into sets of packets constituting an application layer message using network information within the packets to sequence each set of packets into a string of bytes constituting a message, and outputting the sequence to the classification module.

* * * * *